United States Patent [19]

Hodson

[11] Patent Number: 5,045,860

[45] Date of Patent: Sep. 3, 1991

[54] METHOD AND ARRANGEMENT FOR PROBABILISTIC DETERMINATION OF A TARGET LOCATION

[75] Inventor: Eric S. Hodson, Coronado, Calif.

[73] Assignee: R & D Associates, Marina Del Rey, Calif.

[21] Appl. No.: 544,842

[22] Filed: Jun. 27, 1990

[51] Int. Cl.$^5$ ............................................... G01S 3/02
[52] U.S. Cl. ..................................... 342/451; 342/465; 364/449
[58] Field of Search ............... 342/387, 450, 451, 463, 342/465; 364/449

[56] References Cited

U.S. PATENT DOCUMENTS

| | | |
|---|---|---|
| 3,242,494 | 1/1962 | Gicca . |
| 3,659,085 | 4/1972 | Potter et al. . |
| 3,723,960 | 3/1973 | Harris . |
| 4,025,920 | 5/1977 | Reitboeck et al. . |
| 4,031,501 | 5/1977 | Caruso . |
| 4,275,399 | 6/1981 | Marom . |
| 4,621,267 | 11/1986 | Wiley . |
| 4,716,414 | 12/1987 | Luttrell et al. ...................... 342/179 |
| 4,796,191 | 1/1989 | Honey et al. ........................ 364/449 |
| 4,799,062 | 1/1989 | Sanderford, Jr. et al. . |
| 4,806,936 | 2/1989 | Williams et al. ..................... 342/363 |
| 4,811,308 | 3/1989 | Michel . |
| 4,860,216 | 8/1989 | Linsenmayer . |

OTHER PUBLICATIONS

Technical Note 820—"Technical Description of NOS-CLOC, An HFDF FIX Program", by D. L. Burdick and M. C. Mudurian, dated Jan. 28, 1980.

Primary Examiner—Theodore M. Blum
Attorney, Agent, or Firm—Poms, Smith, Lande & Rose

[57] ABSTRACT

According to a target locating method and system, each of a plurality of sensing stations, for example HFDF sensors, senses a nominal value of a predetermined measurement variable such as a bearing, differential times of arrival, etc., relating the location of a potential target in a target area to the location of each respective sensing station. Error models associated with each sensing station, along with the nominal measured variable for each sensing station, are transmitted to a central data collector. A central processor receives the collected data and directs a monitor to display a representation of the target area. The invention also provides a method for estimating the position of the target based on the nominal measurements of the location variable and also on the error models for each sensing station. The target area is divided into a grid of target area segments. The processor then determines a partial probability that the target lies in each given target area segment based on the nominal measurement and error model for each sensing station independently. A composite probability value representing the probability that the target lies in each given target area segment is then calculated based on the partial probabilities for each sensing station. The processor then directs the display to represent the target area as regions of probability of for the location of the target.

15 Claims, 5 Drawing Sheets

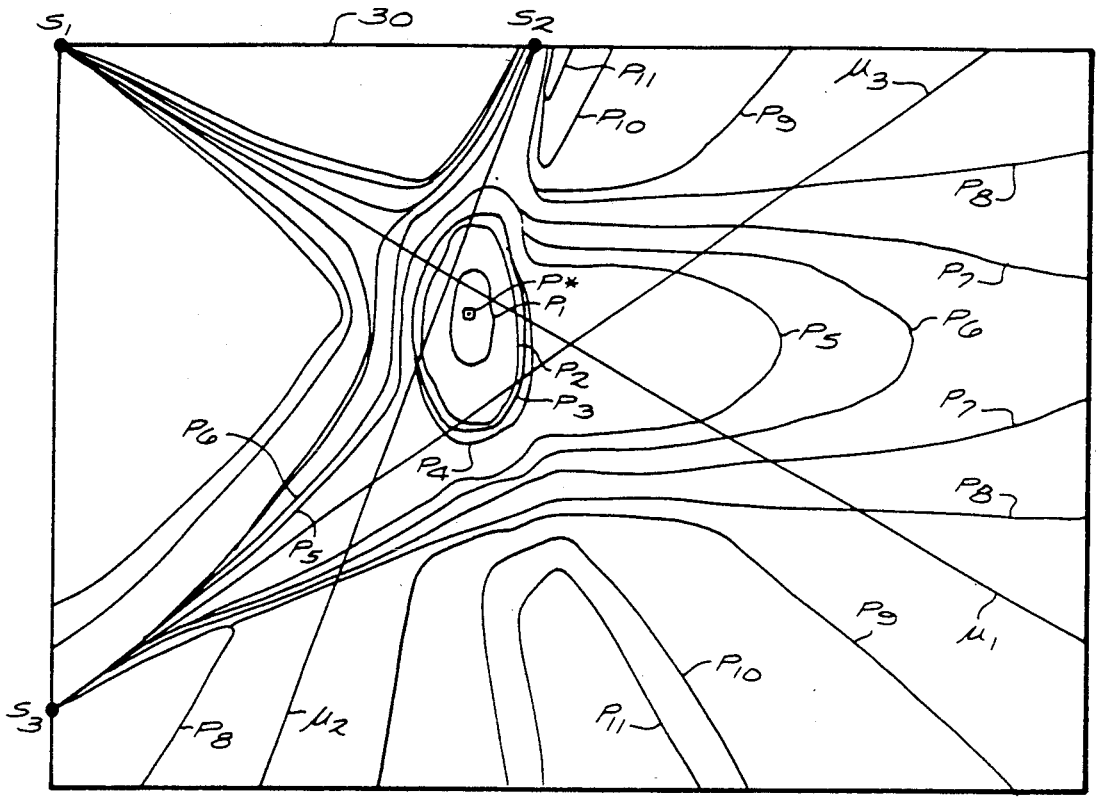
FIG. 4
FIG. 5
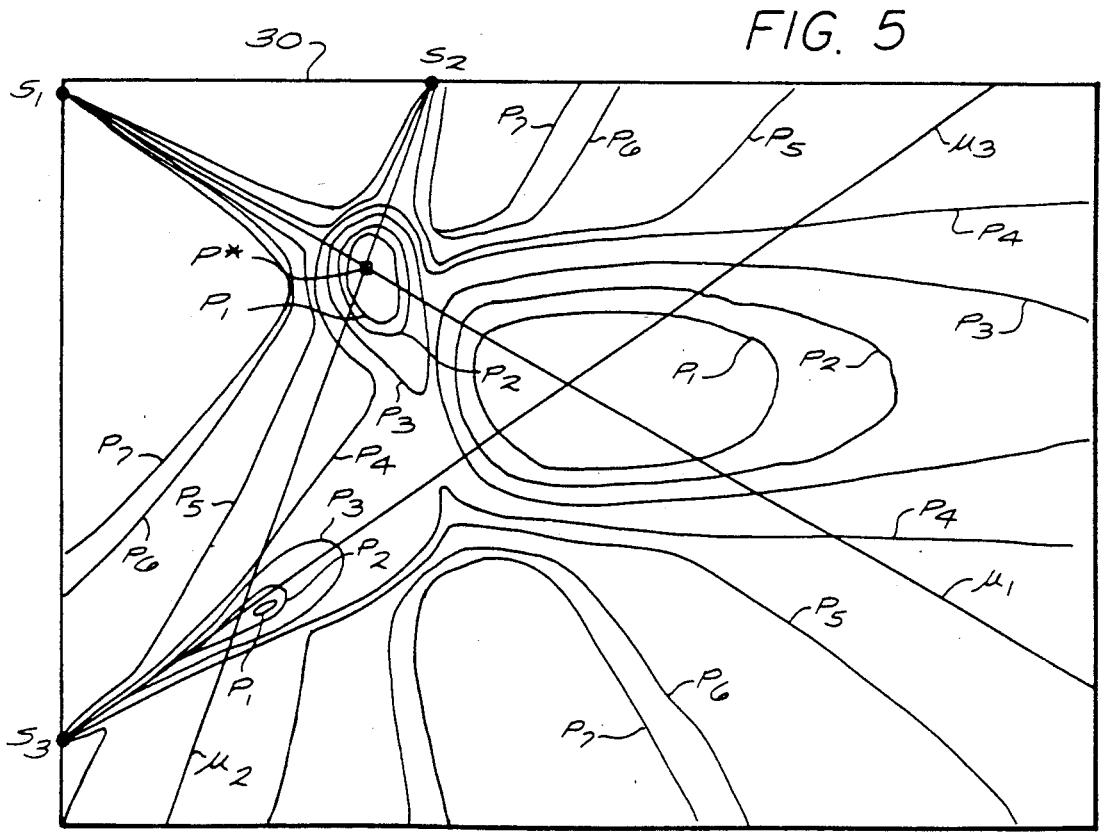

METHOD AND ARRANGEMENT FOR PROBABILISTIC DETERMINATION OF A TARGET LOCATION

FIELD OF THE INVENTION

This invention relates to a method and an arrangement for determining the location of a target as a function of signals received at a number of sensing stations.

BACKGROUND OF THE INVENTION

In both military and civilian applications, it is often necessary or desirable to be able to determine the location of some target. At sea, for example, a target vessel will often emit radio or other electromagnetic signals. These signals are picked up by direction-finding equipment either on friendly surface vessels or at land-based receiving stations. By analyzing the properties of the signals, one wishes to calculate the position of the broadcasting target vessel.

A similar situation arises in the civilian world, for example, when a vessel in distress broadcasts radio signals which are sensed by land-based receiving stations. Especially in this case, one wishes to be able to determine very quickly where the sending vessel is in order to direct rescue ships or aircraft as accurately as possible.

Perhaps the simplest and most widely known method of locating a signal source is based on the principle of "triangulation." To illustrate this principle, assume that the bearing to a target from each of two receiving stations is known. By drawing the line of bearing (LOB) from each of the receiving stations on a chart, the lines will, in almost all cases, intersect each other in a point. Such an intersection establishes a traditional "fix," and one normally assumes that the target is at or near the fix.

The seeming definiteness of the fix, however, is at best often uncertain and at worst outright dangerous. This is because the reliability of the fix is directly related to the accuracy of the measured variable, in this case, the bearing. In most cases, there will be some measurement error due to the inherent limitations of the measurement equipment and/or as a result of natural disturbances.

The uncertain nature of the fix is usually made apparent as soon as a third line of bearing is taken. Normally, this third LOB will not intersect the other two in the original fix point, but rather will intersect each of the other two lines of bearing at other points. The line segments between each pair of points of intersection form a triangle. Traditionally, one has assumed that the target (or, in the case of celestial, radio, or visual navigation, the position of one's own ship) lies somewhere within the triangle. The certainty of this estimation is typically considered greater the smaller the triangle is.

When a fourth line of bearing is drawn, it will often not intersect the "triangle" at all, and the same applies when additional lines of bearing are drawn. Even though the LOBs do not intersect in a point, each LOB adds information, and the closer the intersections between each pair of LOBs is to the other intersections, the better the "fix" is normally assumed to be.

A problem arises when a line of bearing passes far from all the others. The location or navigation system or operator must then determine whether to assume the deviant LOB is so in error that it is to be excluded, thus losing potentially valuable information. The very fact that the LOBs do not intersect in a point, however, illustrates the uncertainty which arises due to measurement errors. It also illustrates a major drawback of deterministic systems: systems which give a precise determination of latitude and longitude to the operator typically fail to provide the operator with information concerning the probable degree of accuracy of the determination.

U.S. Pat. No. 3,242,494 (Gicca, Mar. 22, 1966) discloses a system for self-location or navigation. The disclosed system is not useful for surveillance purposes. Furthermore, the concept of measurement error is not addressed and the position solution is arrived at in a deterministic manner by solving a set of simultaneous equations. The measurements made in this system are, however, so precise relative to the necessary accuracy that error may be ignored with minimal loss.

U.S. Pat. No. 3,659,085 (Potter, Apr. 25, 1972) discloses an entire system for geolocation. This system uses the conventional method of processing location data and the Potter patent mentions that the well-known weighting technique of "least-squares" is used to reduce errors statistically. One limitation of this system is that it provides only a single mode (probable location area) or answer regardless of how disparate the data is. The system disclosed in the Potter patent is extremely complicated and uses time-of-arrival (TOA) measurements alone, requires a large number of stations, and also requires a "pulsed" type signal. In other words, the Potter patent discloses a specific complete system which is designed to solve a single precise problem using a single type of equipment.

U.S. Pat. No. 3,723,960 (Harris, Mar. 27, 1973) is an acoustic geolocation system which also uses TOA measurements. As in other prior art geolocation systems, the Harris system provides a deterministic solution with no indication of how errors in measurements are resolved.

U.S. Pat. No. 4,031,501 (Caruso, June 21, 1977) similarly describes an acoustic TOA system which neglects errors and which makes the implicit assumption of a single, unambiguous solution which all data must "fit."

U.S. Pat. No. 3,886,553 (Bates, May 27, 1975) describes yet another TOA system, but provides a final solution based on the technique of "pattern recognition," according to which a measured occurrence is compared with a catalogued set of prior occurrences. The Bates system is limited in scope in that it requires TOA measurements and it inferably also requires a high degree of precision since no variance or error models are mentioned. Furthermore, the Bates system provides only a single unique solution.

U.S. Pat. No. 4,275,399 (Marom, June 23, 1981) discloses an antenna system which can be used to determine the direction of arrival of an incoming signal. Although such an antenna arrangement is suitable for incorporation into many geolocation systems, the Marom patent does not address the problem of determining the position of a target.

U.S. Pat. No. 4,621,267 (Wiley, Nov. 4, 1986) describes a system for determining the location of a target based on azimuth and "depression" measurements from aircraft. The Wiley system measures differential times of arrival at various sensors and attempts to determine the position of the target by comparing the differential time measurements to a discrete and predetermined set of possible solutions. The Wiley system is not generally applicable to surface-based location systems.

U.S. Pat. No. 4,799,062 (Sanderford, Jan. 17, 1989) describes yet another TOA scheme, but discloses primarily a hardware configuration. The geolocation method mentioned int he Sanderford patent relies on well-known time-of-arrival calculations. However, the text does not describe its computational scheme, and it is inferable that the Sanderford system is designed to provide a deterministic solution.

U.S. Pat. No. 4,811,308 (Michel, Mar. 7, 1989) describes a system in which acoustic and seismic sensors are combined for use in a tracking system, especially for otherwise undetectable "stealth" aircraft. The ultimate output of this system is a "track," with intermediate point estimates of the location of the target. The method used in this system is nothing more than simple triangulation, taken to be a least-squares or weighted centroid solution.

U.S. Pat. No. 4,860,216 (Linsenmayer, Aug. 22, 1989) describes a system which is primarily concerned with the identification or correlation of signals, and no clear geolocation solution is described in this patent. Furthermore, the Linsenmayer system uses a predetermined set of hypothetical solutions (chafe, fuel tanks, re-entry vehicle, etc.), and attempts to identify the target as one solution in this predetermined set.

Finally, Technical Note 820 of the Naval Ocean Systems Center of San Diego, Calif., entitled "Technical Description of NOSCLOC, an HFDF Fix Program" by D. L. Burdick and M. C. Mudurian, published on Jan. 28, 1980, describes a geolocation system in which the intersections of pairs of LOBs are determined. The intersections are then weighted and the system finally computes a fix, i.e., a single solution, as the weighted centroid of the weighted intersections. An unbiased minimum variance estimate is thereby obtained.

The NOSCLOC system also includes an "outlier routine" which attempts to check the internal consistency of the fixes and, using statistical criteria, excludes measurements which the routine identifies as outliers. Under certain circumstances, the NOSCLOC routine will eliminate all of the measurements from the station whose bearing is the farthest from the median centroid if there are two or more outliers. The disadvantage of this elimination routine is that information is automatically discarded based on a predetermined evaluation routine, even though this information might be of some value to the human operator who must make a decision based on the estimated location of the target.

SUMMARY OF THE INVENTION

This invention eliminates the above-mentioned disadvantages by providing a system in which each of a plurality of sensing stations senses a nominal value of a predetermined measurement variable relating the location of a potential target in a target area to the location of each respective sensing station. Error models associated with each sensing station, along with the nominal measured variable for each sensing station, are transmitted to a central data collector. A central processor receives the collected data and directs a monitor to display a representation of the target area.

The invention also provides a method for estimating the position of the target based on the nominal measurements of the location variable and also on the error models for each sensing station. The target area is divided into target area segments, for example by representing the target area as a grid of latitude and longitude lines. The processor then determines a partial probability that the target lies in each given target area segment based on the nominal measurement and error model for each sensing station independently. A composite probability value representing the probability that the target lies in each given target area segment is then calculated based on the partial probabilities for each sensing station. The processor then directs the monitor to display regions having successive levels of probability for the location of the target.

According to another aspect of the invention, by using an input unit, the user may direct the processor to isolate certain ones of the target area segments represented on the monitor, whereupon the processor calculates the probability that the target lies in the chosen isolated target area segments.

In a preferred embodiment of the invention, the sensing stations are high-frequency direction-finding (HFDF) devices. In this case, the location variable is the bearing between the target and each respective sensing station. In the simplest embodiment, the error model for each sensing station is assumed to be a Gaussian probability distribution function having a mean value equal to the nominal sensed bearing and having a predetermined standard deviation. Accordingly, the probability that the target lies at a given bearing from the sensing station decreases as that bearing becomes farther from the nominal bearing (the mean value) sensed by the station. According to a preferred embodiment of the invention, for each sensing station, the probability that the target lies at a given bearing from the sensing station is determined by using the bearing to a reference point in each target area segment and by using this reference point bearing as the argument (the input variable) to a Gaussian error distribution function. The probability thus calculated constitutes a partial probability for that sensing station and that target area segment. The composite probability for each target area segment is determined by multiplying all of the partial probabilities for that segment.

In other embodiments of the invention, the sensing stations in the system measure time of arrival (TOA) of an emitted signal from the target, or differential time of arrival of the emitted signal and a reference signal from the target.

Significant advantages of this invention are that potentially relevant information is never discarded automatically, the ability of the system to estimate the position of the target is not defeated by lines of bearing which do not intersect, and the system enables the user to make natural judgments based on experience in those cases in which the uncertainty of measurements is so great that tow or more regions in the target area have an equal or nearly equal probability of containing the target. In short, this invention provides greater flexibility than prior art systems, and uses and presents to the user all relevant information.

BRIEF DESCRIPTION OF THE DRAWINGS

FIGS. 4-7 illustrate examples of displayed representations of various target areas and show examples of calculated regions of probability for different configurations of sensing stations and for different degrees of agreement between measured bearings form the sensing stations.

DESCRIPTION OF THE PREFERRED EMBODIMENTS

In order to understand the method by which this invention estimates the position of a target, one must have some familiarity with the concept of a probability distribution function. In general, a probability distribution function is a mathematical expression which relates a given value of some variable to the likelihood that the variable will assume the given value.

For example, the likelihood that one will role seven (the most likely outcome) with two dice is 6/36 (=1/16), whereas the likelihood that one will roll two is only 1/36. The probability of rolling twelve is also 1/36. The probability distribution for dice could therefore be represented as an x-y graph with the values two to twelve along the x-axis and the values 1/36 to 6/36 along the y-axis. The graph would be in the shape of points arranged along a "roof," rising linearly from a y-value of 1/36 at each edge (for two and twelve) to a y-value of 6/36 at the middle (for seven). To determine the probability of rolling a five, one would simply find the value five on the x-axis and then read off the probability (4/36) on the y-axis corresponding to the abscissa of the function for the ordinate five. In the foregoing example, the value five is the "argument" for the probability distribution function of dice.

Figure 1:
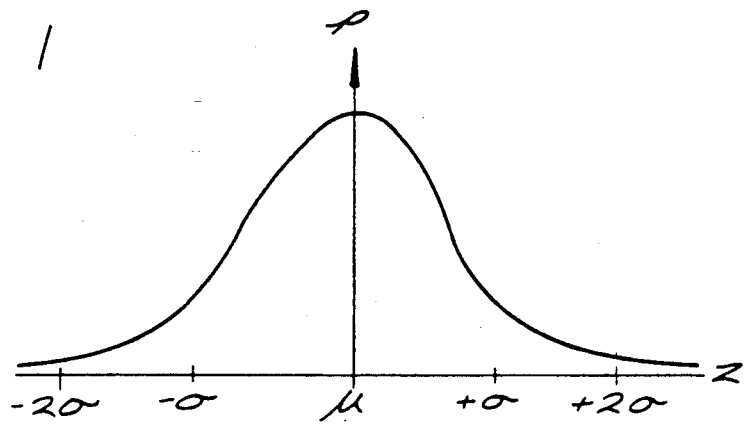
FIG. 1 illustrates a normal probability distribution, which is used according to the invention as one possible error model.

FIG. 1 illustrates a well-known Gaussian or "normal" distribution function, which is known to describe many commonly occurring types of randomly varying phenomena such as measurement errors. The mathematical expression defining the normal distribution is:

$$N(Z; \mu, \sigma^2) = 1/(sqrt(2\pi) \cdot \sigma) \cdot exp(=\frac{1}{2}((\mu=Z)/\sigma)^2)$$

where "$\mu$" is the mean value, "$\sigma$" is the standard deviation, "sqrt" is the square-root function and "exp" is the exponential (base e) function. In order to determine the probability that the argument variable Z will assume a given value, the values for $\mu$ and $\sigma$ must first be known. The mean $\mu$ and the standard deviation $\sigma$ determine the shape of the curve shown in FIG. 1. The mean value $\mu$ determines where the "peak" of the curve will lie (that is, where the most likely value is located) and the standard deviation $\sigma$ determines the "flatness" of the curve; the greater $\sigma$ is, the "flatter" the curve in FIG. 1 will be. Once $\mu$ and $\sigma$ are known, however, the probability that Z will assume some given value is readily determined using known methods by setting Z equal to that value in the expression above. For the sake of clarity, in the examples given below, all probability values are rounded to five decimal places.

Assume, for example, that $\mu=0$ and $\sigma=5$ ($\sigma^2=25$). The probability that Z=0 (that is, that Z will come out equal to the mean value $\mu$) is N(0; 0, 25) 0.07979. The probability that Z=5 (that is, that Z will come out equal to the standard deviation $\sigma$) is N(5; 0, 25)=0.04839. This latter value is commonly referred to as the "one-sigma" sigma" value. The "two-sigma" value, that is, the probability that $Z=2 \cdot \sigma=10$ is N(10; 0, 25)=0.01080. As these calculations and FIG. 1 show, the probability that Z will assume a given value decreases with the distance of Z from the mean value $\mu$.

Figure 2:
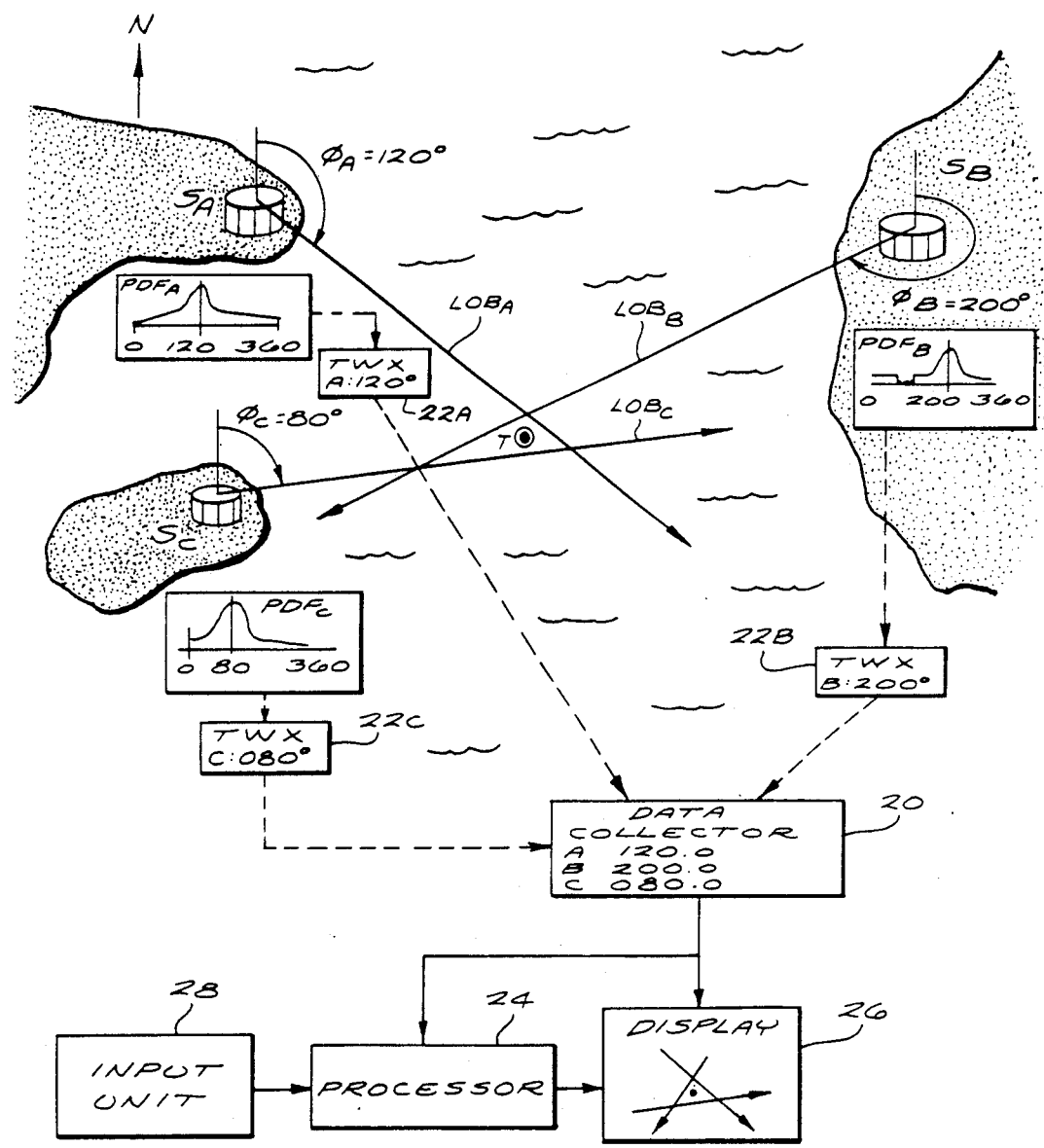
FIG. 2 illustrates one example of the system according to the invention in which three land-based sensing stations are used to determine the position of a target at sea.

FIG. 2 illustrates one example of a system configuration according to the preferred embodiment of this invention for estimating the location of a target. In the example shown in FIG. 2, three land-based sensing stations $S_A$, $S_B$ and $S_C$ are provided for sensing signals emitted by a sea-based target T (indicated with a circle-dot). It is to be understood that the invention is in no way limited to three stations; the location method according to the invention may be used with any number of sensing stations, although the accuracy of the invention will normally increase as the number of sensing stations increases. Also, the invention is not limited to sea-based targets and land-based sensing stations.

In the preferred embodiment, the sensing stations are conventional High Frequency Direction Finding (HFDF) sensors. Other types of sensors which may be used according to the invention are discussed below. Each HFDF station generates an output signal corresponding to a sensed bearing, relative to some reference direction such as true or magnetic north, from the respective station to an RF signal source. In this case, the target T is the signal source, although, in certain applications mentioned below, the target T may be only a source of *reflected* signals. In this example, it is assumed that the sensing stations $S_A$, $S_B$ and $S_C$ determine a measured bearing of the incoming signal emitted from the target T.

In the illustrated example, the target T, for example a ship, has emitted a signal, for example a distress signal or other radio transmission. In FIG. 2, measured bearings are indicated by the letter $\phi$ with the same subscript as the corresponding sensing station. In the example shown, the sensing station $S_A$ senses that the signal emitted from the target T has arrived with a bearing $\phi_A=120°$ relative to north. A measured line of bearing $LOB_A$ originating in the sensing station $S_A$ and extending in the direction 120° is thereby established. Similarly, the respective measured bearings and lines of bearing for the sensing stations $S_B$ and $S_C$ are $LOB_B$ for $\phi_B=200°$ and $LOB_C$ for $\phi_c=80°$.

One should observe that the lines of bearing are the *measured* LOBs. Also, in the illustrated example, the measured LOBs all are somewhat inaccurate, that is, different from the true lines of bearing from their respective sensing stations. This is the normal situation since cosmic (e.g. sun spots), atmospheric and surface phenomena, as well as physical obstructions, will cause the signal emitted from the target T to deviate from a straight-line path. Also, measurement errors inherent in the sensing stations will cause measured bearings to differ from the true bearings even were the target signal to travel in a perfectly straight line between the target and the sensing station.

According to this invention, a statistical error model is determined for each sensing station. This is preferably done using known empirical techniques, which normally involve sending a large number of test signals under different atmospheric conditions and over the entire sensing range of each station (for example, through all 360 degrees of bearing for an HFDF station) from a reference transmitter having a precisely known bearing from each sensing station. Theoretical estimates of the error models may also be used. The statistically varying deviations of the measured signals are then compared with the known reference signals. Since these deviations normally vary randomly, they may be described using a probability distribution function.

In many typical cases, the probability distribution of measurement errors made by HFDF sensors agrees closely with the normal or Gaussian distribution function illustrated in FIG. and explained above. In the following discussion of the invention it is therefore assumed by way of example only that the probability distribution of measurement errors for each sensing station is normally distributed with mean $\sigma$ and standard deviation $\sigma$. According to the method of the invention, a user organization develops an error model in the form of a error probability distribution function for each station. These models may be Gaussian, as in FIG. 1, or may have any other characteristics. Any probability distribution function may be used as the error model for a sensing station, and Gaussian models are assumed in this description by way of example only, and also because they will be the most common models adopted in practical applications of this invention.

Furthermore, as is explained below, even Gaussian error models need not be uniform for each station over the entire target area, but rather the target area may be divided into different deviation regions, with the standard deviation and possibly even bias values being different in different deviation regions. The accuracy of certain sensors, such as the HFDF sensors assumed in the illustrated embodiment, may for example vary as a function of the distance of the target from the station, over different bearing sectors, as a function of the time of day or year, etc. The error model for a given station may therefore be a *set* of probability distribution functions, with different distributions being applicable in different regions of the target area or at different times.

Also by way of example, it is assumed below that the measurement error for each station is unbiased, meaning that the most probable true bearing to the target is also the bearing actually measured (which means that the "bell curve" of FIG. 1 will have its peak for $Z=\mu$). In actual applications of the invention, bias values may be easily incorporated using known methods into the error model for any given sensing station.

In FIG. 2, examples of Gaussian error models (probability distribution functions, or "PDFs") for the sensing stations $S_A$, $S_B$ and $S_C$ are indicated by the graphs $PDF_A$, $PDF_B$ and $PDF_C$. Observe that the "peak" of each probability curve is at the value of the corresponding measured bearing $\phi_A$, $\phi_B$ and $\phi_C$ consistent with the assumption (not necessary according to the invention), that errors are unbiased.

Observe also that the error model $PDF_B$ for the sensing station $S_B$ is not "smooth," in that the indicated probability drops to near zero for measured bearings ranging from approximately 45° (northeast) to 135° (southeast). This illustrates the way in which known geographical information may be included in the error model. Assuming by way of example that the land mass on which the sensing station $S_B$ is located widens and extends eastward, and that only sea-based targets are sought, it would be impossible (probability equal to zero) for the measured bearing signal $\phi_B$ to be accurate if it indicates the sea-based target is on the land mass.

The preferred embodiment of the invention includes a data collection or fusion unit 20, to which data transmission units 22A, 22B and 22C transmit the measured bearings $\phi_A$, $\phi_B$ and $\phi_C$ from each sensing station $S_A$, $S_B$ and $S_C$, respectively. The connection between the transmission units and the data collection unit may be either hardwired or wireless. The system according to the invention also includes a processor 24, a monitor 26 and an input unit 28. The processor 24 also either includes a memory unit (not shown) or is connected in a conventional manner to a separate memory unit. The input unit is for example a keyboard, light pen, mouse, etc., or a combination of these known input units. The data collection unit 20 transfers the collected bearing information to the processor 24 and, in certain applications (although not necessarily), also directly to the monitor 26.

The fixed parameters (for example, constant standard deviations) defining the error models $PDF_A$, $PDF_B$ and $PDF_C$ for the respective sensing stations are preferably prestored either in the memory unit of the processor 24 or in some other peripheral memory unit. However, these parameters may also be transmitted via the data transmission units 22A, 22B and 22C to the data collection unit 20 either periodically, each time the parameters are found to have changed (for example as a result of a new calibration or known time-related changes), or along with the measured bearing information each time a target signal is sensed by the respective stations. The processor 24 directs the monitor 26 to display a representation of the target area and, preferably, lines simulating the measured lines of bearing on the displayed representation of the target area.

Figure 3:
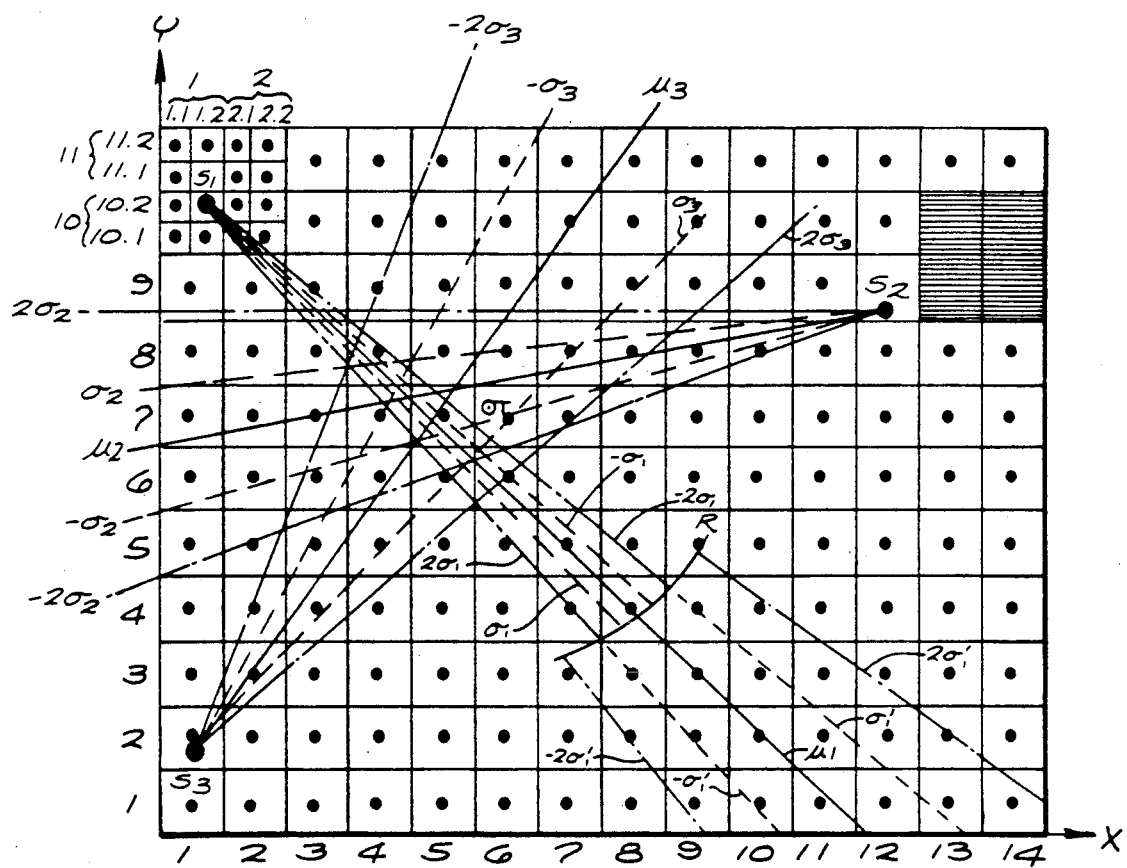
FIG. 3 illustrates a representation of the target area shown in FIG. 2 and also illustrates a preferred method for determining the location of the target.

FIG. 3 is a geometrical, graphical representation of a three-station locating system similar to the one illustrated in FIG. 2. By way of example only, in FIG. 3 the representation of the target area is divided by the processor into a 14×11 primary x-y grid. However, in most applications, the grid will instead be divided by lines of latitude and longitude. There is no need for the grid to be rectilinear, and examples of other grid systems will be described below. For ease of understanding only, the target area grid in FIG. 3 is labelled 1-14 in the x-direction and 1-11 in the y-direction. Each target area segment can thus be identified using the grid notation G(n,m), where n is the x-coordinate and m is the y-coordinate of its location. For example, in FIG. 3, the target T lies in G(6,7), the first, second and third sensing stations $S_1$, $S_2$, and $S_3$ lie, respectively, in G(1,10), G(12,9), and G(1,2).

In certain situations it may be desired to subdivide primary target area segments even further into smaller, secondary segments. For example, certain areas may be particularly well-charted or a sensing station may be especially accurate at close range, so that a finer grid subdivision will allow faster and more accurate target location. To illustrate this possibility according to the invention, the target area segments G(1,10), G(1,11), G(2,10), and G(2,11), are each subdivided into four quarter segments. This additional subdivision may also be done after a rough first estimate of the target location is determined in order to lessen calculation time.

As FIG. 3 also illustrates, the processor also associates a segment reference point with each target area segment G(1,1), G(14,11). In the illustrated example, the reference point for each segment is located approximately at the center of the segment. According to the invention, the reference points are stored in the memory unit as sets of coordinates relative to some standard origin. For example, when lines of latitude and longitude are used to define the target area grid, the locations of the respective reference points are preferably also stored by latitude and longitude.

As in the example described above in connection with FIG. 2, assume that the target has emitted a signal, and that the sensing stations $S_1$, $S_2$, and $S_3$ are HFDF sensors whose output signal corresponds to nominal bearings at which they sense arrival of the emitted target signal. Assume for purposes of example that the nominal bearings $\phi_1$, $\phi_2$, and $\phi_3$ to the target T as sensed by the respective sensing stations $S_1$, $S_2$, and $S_3$ are approximately 133°, 260° and 36°. FIG. 3 shows nominal lines of bearing $\mu_1$, $\mu_2$, and $\mu_3$ corresponding roughly to these nominal bearings. Using known calibration methods, assume further that the standard deviations $\sigma_2$ and $\sigma_3$ of the bearing measurements of the respective sensing stations $S_2$ and $S_3$ are determined to be 10° each.

Within a radius R, assume that the standard deviation of bearing measurements for the first sensing station S is $\sigma_1 = 5°$, but that beyond the radius R, the standard deviation of the first sensing station is predetermined to be $\sigma_1' = 10$. It is not uncommon that the standard deviation for a sensing station will change beyond a certain radius. For example, the minimum standard deviation for most common HFDF sensors is achieved for ranges of less than 1000 km, which is the maximum "one-hop" length off the ionosphere for an emitted signal under average propagation conditions. The deviation characteristics of HFDF sensors are commonly compiled graphically in a "Ross range curve."

HFDF equipment is commonly tuned for vertical angles of arrival less than 10–15°, and the angle of arrival of signals from nearby targets may well exceed this; consequently, in certain cases, the standard deviation may actually be *greater* within some near range, decrease up to a second range, and increase beyond this second range. A significant advantage of this invention is that as long as the pattern of standard deviation can be predetermined, the invention can take even an irregular deviation pattern into account automatically and with negligible increase in calculation time.

In FIG. 3, evenly dashed lines from each sensing station indicate the 1·$\sigma$ lines of bearing for the respective stations, and dot-dashed lines indicate the 2·$\sigma$ lines of bearing. In like manner, one could include 3·$\sigma$, 4·$\sigma$, etc. lines. Only the first two $\sigma$ lines have been included for the sake of clarity. As is explained below, these lines are merely illustrative, since the processor calculates all necessary values analytically and not with reference to artificially generated lines.

As drawn in FIG. 3, the $-2·\sigma_3$ line intersects the reference point for the target area segment G(4,9). Once again, assume by way of example that the nominal sensed bearing of the emitted signal relative to $S_3$ is $\phi_3 = 36°$. The probability, based solely on the measurement by the third sensing station $S_3$, that the signal emitted by the target has arrived at a bearing $(\phi_3 - 2·\sigma_3)° = (36 - 2·10)° = 16°$ relative to $S_3$ is therefore determined by the processor to be $N(Z; \phi_3 \sigma_3^2) = N(16; 36, 100) = 0.00540$.

Similarly, the $\sigma_3$ line intersects the reference point for G(7,8), so that the probability, based solely on the $S_3$ measurement, that the true bearing of the emitted target signal is $(\phi_3 + \sigma_3)° = (36 + 10) = 46°$ is determined by the processor to be $N(46; 36, 100) = 0.02420$. Of course, it is not necessary—and indeed it is rare—that the nominal bearing line, or any of the "$\sigma$-lines" inter-sects a reference point exactly. Intermediate points are evaluated with equal ease using known methods. For example, the reference point G(2,7) is at a bearing of approximately 262° from station $S_2$, and lies on none of the "whole-$\sigma$" lines. Based solely on the measurement $\phi_2 = 260°$ by station $S_2$, the probability that the true target bearing is 262° is calculated by the processor to be $N(262; 260, 100) = 0.03910$.

In FIG. 3, the area segments G(13, 9), G(13, 10), G(14, 9), and G(14, 10) are blackened to indicate that the probability of the target lying in these target area segments is zero. As above, this may be the case when it is known beforehand that the target cannot lie in these segments. When the target is known to be a sea-going vessel, these segments may for example correspond to a known land mass.

The technique according to the invention of marking as impossible certain area segments is also applicable in other cases. For example, if it is known that the accuracy of a sensing station over certain area segments is so poor that its measurements are completely unreliable, these segments may be marked by the processor (under the direction of the operator) in such a way that it will use only data from other sensing stations to determine the composite probability that the target lies in those area segments. Note that this can also be accomplished by defining the standard deviation pattern for that sensing station so that the standard deviation for those segments is extremely large, thus reducing to almost zero the value of the chosen probability distribution function even for points lying directly on the nominal line of bearing.

Although the grid may be redefined for each use of the invention, normally at least an initial grid will be defined for the target area. In such case, the positions of the reference points for each area segment will be fixed relative to each of the stations in the system. In actual applications, it will therefore normally be possible to pre-calculate and pre-store in the memory unit the reference point bearings using known analytical methods, not only for Cartesian grid systems such as the one shown in FIG. 3, but also for latitude/longitude grids, hyperbolic grids, etc.

In a typical application, however, in which the target area grid may include thousands, tens of thousands, or even hundreds of thousands of area segments, the memory unit may not be sufficient to pre-store the reference point bearings. In such case, the reference point bearings may be calculated anew for each sensed signal, possibly also using predetermined criteria for reducing calculation time, for example by starting with area segments lying nearest intersections of LOBs and working outward, etc. Such trade-offs between calculation time and memory storage size are common in digital technology and are therefore not discussed further here.

According to the invention, when a signal is sensed by the reference stations $S_1$, $S_2$, and $S_3$ (and, of course, by any others if more than three are included), the nominal bearings $\phi_1$, $\phi_2$, and $\phi_3$ are first determined. The nominal bearings are transmitted to the processor 24 via the data collector 20 (see FIG. 2). The probability distribution functions, or any updates thereto, for the respective stations are also transmitted if these have not been pre-stored. Recall that the probability distribution functions need not be continuous, but rather may consist of different functions (or merely different standard deviations) for different target area segments or groups of target area segments.

The bearings to each reference point for each sensing station are then in turn either calculated or retrieved from the memory unit, and are used as arguments to the corresponding probability distribution functions. As in the example above, for each sensing station, a probability value is thereby determined. For each target area segment (reference point), there will therefore normally be as many probability values as there are sensing stations. Each of these probability values is referred to below as a partial probability value. The partial probability values for each target area segment are thus in part a function of the location of the associated reference point relative to the sensing stations.

According to this invention, after the processor determines all partial probability values for all target area segments of interest, the processor then calculates a global or composite probability value for each target area segment by multiplying the corresponding partial probability values. Although not necessary according to the invention, the partial probability values may also be weighted. It is theoretically possible to calculate the probability that the target lies in a given target area segment by integrating the global probability values over every point in the segment; however, although possible, this method requires needlessly complicated and timeconsuming calculations. According to this invention, the global probability value obtained on the basis of the reference point in each target area segment is assigned to the entire segment. The error of this approximation is negligible, especially since the target area segments are small compared to the total target area.

As is mentioned above, in order to save memory storage space or calculation time, a coarse grid size may be used to determine a coarse estimate of the target location. Regions of greatest probability may then be subdivided using a finer grid, and the processor may then recalculate partial and global probability values for each of the subdivided, small target area segments.

In a preferred embodiment of the invention, once the processor has determined the global probability values as described above, it then directs the monitor 26 (see FIG. 2) to display the target area as a pattern of discrete probability regions. FIG. 4 illustrates one example of such a display for a three-station sensing system such as the ones described above. In FIG. 4, a border 30 indicates the outer border of the monitor display, and thus the border of the displayed target area. The configuration illustrated in FIG. 4 is such that the first sensing station $S_1$ is at the top left corner, the second sensing station $S_2$ is near the center of the top of the border 30, and the third sensing station $S_3$ is near the bottom left corner.

As FIG. 4 illustrates, the displayed target area resembles a topographic map. In FIG. 4, eleven probability boundary lines p1, p2, ..., p11 are indicated. According to the invention, the processor classifies the global probability values (and thus the target area segments) into probability intervals. In other words, the processor classifies all target area segments having global probability values which lie between predetermined boundary values as belonging to the same probability region. For example, all target area segments lying between lines p5 and p6 lie in the same probability region. Observe that for each probability interval, there usually will be two or more separate regions of the displayed target area having the same probability classification; for example, there may be several boundary lines p5 and p6.

According to this invention, the displayed target area is preferably color-coded, such that different probability regions are displayed using different colors. In one prototype, regions having the lowest probability were displayed in black, regions of slightly greater probability were displayed in increasingly bright shades of blue, and so on, passing through greens and yellows to the regions of greatest probability, which were displayed using orange-brown. The estimated target position was displayed as a small box. Of course, other color schemes will be apparent.

In FIG. 4, one displayed target area segment is marked p*. This target area segment is the one having the greatest global probability value, and corresponds to the estimated target location. According to the invention this target area segment is thus the segment having the maximum likelihood of containing the target based on the measured bearings with the given probability distribution functions for the various sensing stations. Preferably, the monitor also displays the coordinates (e.g., latitude and longitude) of this maximum likelihood segment p*. As FIG. 4 illustrates, the monitor preferably also displays representations of the nominal bearings for each sensing station as displayed bearing lines $\mu_1$, $\mu_2$, and $\mu_3$, which, in the assumed unbiased example, thus correspond to the mean values of the respective probability distribution functions.

For the sake of simplicity only, the probability boundary lines are shown as being relatively smooth in FIG. 4. In actual applications, the lines will normally not be displayed at all, but rather will appear simply as the boundaries between differently colored probability regions. These boundaries will normally be somewhat jagged, with the "smoothness" of the boundaries increasing with increasing resolution of the displayed target area, i.e., with increasing pixel density.

Many prior art location methods also generate regions of probability; however, these prior art methods (for example, methods using the "least squares" technique) almost invariably assume "well-behaved", i.e., elliptical regions. As FIG. 4 illustrates, this invention is not limited to this often greatly erroneous assumption. Using the maximum likelihood method according to this invention, although the probability regions closest to the segment of maximum likelihood p* often will happen to be more or less elliptical, especially when all intersections of LOBs fall close to each other, this is not an imposed condition. Furthermore, the lower the probability of a displayed region, the less elliptical it will usually tend to appear. Observe that in the relatively well-behaved test case shown in FIG. 4, the maximum likelihood target position p* is within the "triangle" formed by the LOBs $\mu_1$, $\mu_2$, and $\mu_3$; the result given by the method according to this invention is thus similar to the result one would expect from many prior art location systems, including, for example, the classical "visual approximation" method used by yachtsmen reducing celestial lines of position. Observe also that the probability region containing p is the only one at a probability level higher than the probability boundary p1.

FIG. 5 illustrates another displayed target area, with the three sensing stations in approximately the same positions as in FIG. 4. In the test case illustrated in FIG. 5, however, the measured LOB $\mu_3$ from the third sensing station $S_3$ deviates much more from the other two ($\mu_1$ and $\mu_2$) than in FIG. 4. As a result, *three* regions are at a probability level greater than p1: the region surrounding the point of maximum likelihood (i.e., the target area segment having the maximum global probability value), the region containing the point of intersection of $\mu_1$ and $\mu_3$, and the region just northeast of the intersection between $\mu_2$ and $\mu_3$. Stated in other terms, in the case illustrated in FIG. 5, there are at least two local maxima in addition to the global maximum.

The test case shown in FIG. 5 indicates that at least one measured bearing has an abnormally large error component, due perhaps to truly anomalous propagation, or perhaps even due to one of the sensing stations having obtained a bearing on the wrong target. One possible way to resolve the ambiguity this error creates is for the operator to declare that the data presented by the monitor is so inconsistent that it should be rejected altogether as having no information value. This is the result which many prior art systems would provide automatically: unable to determine a single region of greatest probability, they would signal a "no-fix" condition and discard the information. Alternatively, many prior art systems would attempt to determine which of the three local maxima is "most likely" using some predetermined exclusion algorithm, and then they would exclude the "less likely" data (for example by excluding the LOB $\mu_3$ from its calculations) and present only a single "fix."

One great advantage of this invention is that the processor does not automatically evaluate all maxima, apply a fixed weighting and exclusion routine, and decide which data to exclude. Instead, the operator is presented with all the information from the sensing stations and is able to make his own judgments about whether to accept or reject any or all apparently deviant information. Also, presented with a displayed target area such as the one illustrated in FIG. 5, the operator may be able to draw on collateral data (e.g known preferred sea routes) to establish which of the maxima is the target location. Absent decisive collateral data, the operator may also decide that *all* of the maxima should be pursued, for example by firing missiles or searching more diligently at all of the local maxima.

Whereas FIGS. 4 and 5 illustrated situations in which the sensing stations were approximately equidistant from the target at p*, this is not always the case. Indeed, tactical sensors are often used in conjunction with long-distance strategic sensors and the data from these different types of sensors must be combined (commonly referred to as being "fused") to reveal to the operator all available information.

Figure 6:
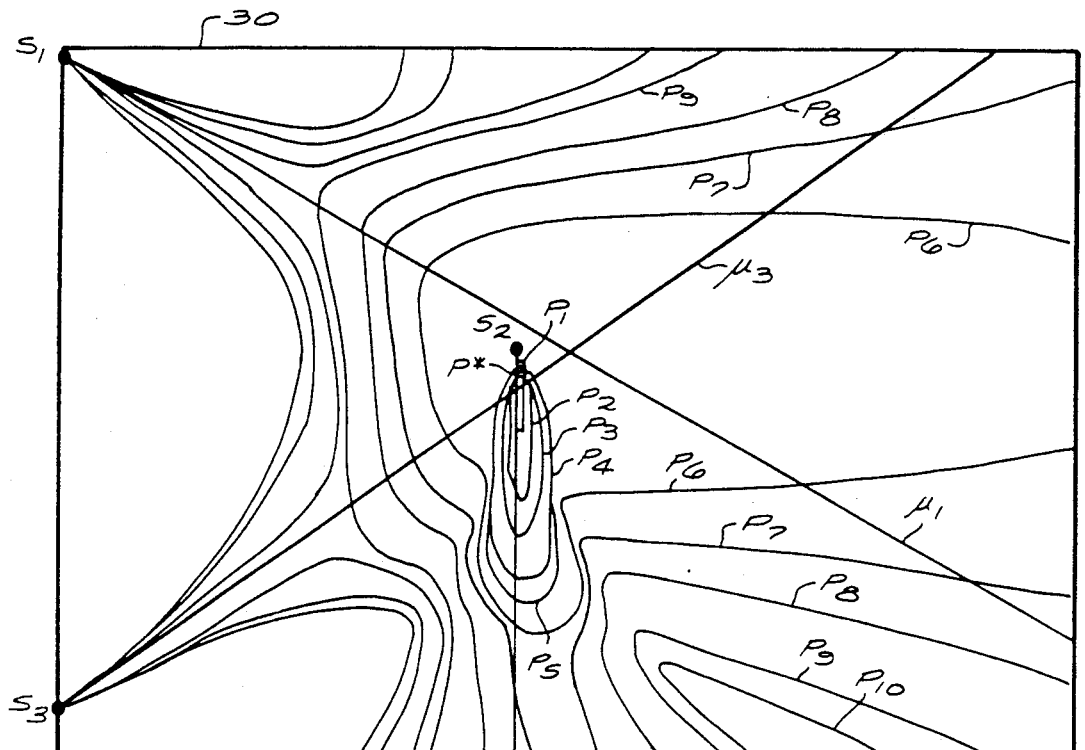

FIG. 6 illustrates such a situation in which data must be fused. In FIG. 6, sensing station $S_2$ is located near the center of the target area, and hence, is represented on the monitor near the center of the displayed target area; the measured bearing $\mu_2$ in this example points south. Empirical evidence indicates that bearings close to a sensor are almost always very accurate, and such empirical information is easily incorporated into the location method according to this invention. Such empirical information will first of all be incorporated into the probability distribution functions of the various sensors. If, for example, sensing station $S_2$ is known to be much more accurate than the other sensing stations, its standard deviation $\sigma_2$ will be correspondingly much smaller. Similarly, if one knows that close-range measurements are particularly accurate, the standard deviation value for the associated probability distribution function may be assigned much smaller than beyond the range of greatest accuracy. This will in turn result in a much lower partial probability (and thus global probability) value for any target area segments which deviate even slightly from the measured LOB $\mu_2$. In other words, high-probability regions will tend to be aligned with $\mu_2$.

Another way of giving assigning added reliability to data from a particular sensing station is to weight the partial probability values for each target area segment, giving higher weight to sensors known to be especially accurate. Yet another method is for the processor first to establish "ranging" information by examining the proximity of the estimated target location to the different sensing stations, and then to weight highly the partial probabilities from the "near station" and to recalculate global probability values.

The test case illustrated in FIG. 6 illustrates two more advantages of this invention. First, because the LOB $\mu_2$ from the second sensing station $S_2$ does not intersect $\mu_1$, most conventional location systems would be unable to determine a "fix." These prior art systems would assume a failure, even though the estimated target location p* in FIG. 6 may very well be extremely accurate because of the nearness of the accurate station $S_2$ to the actual target. The operator would be told only of the "no-fix" status, and would be denied the opportunity to evaluate the data for himself. This invention avoids the "no-fix" trap, since it does not require LOBs to intersect.

The second advantage of this invention which FIG. 6 illustrates is that the regions of highest probability gradient (p1-p5) for the test case shown are aligned with the more highly reliable LOB $\mu_2$. One should also observe that the generally elliptical probability regions p1-p5 are not concentric, but rather depart in an ever more southerly reaching direction along $\mu_2$. All known conventional systems which seek to establish a "fix" assume that the probability contours around the best estimate point p* are concentric ellipses. This invention is not restricted to using such an often unrealistic and inaccurate assumption.

Figure 7:
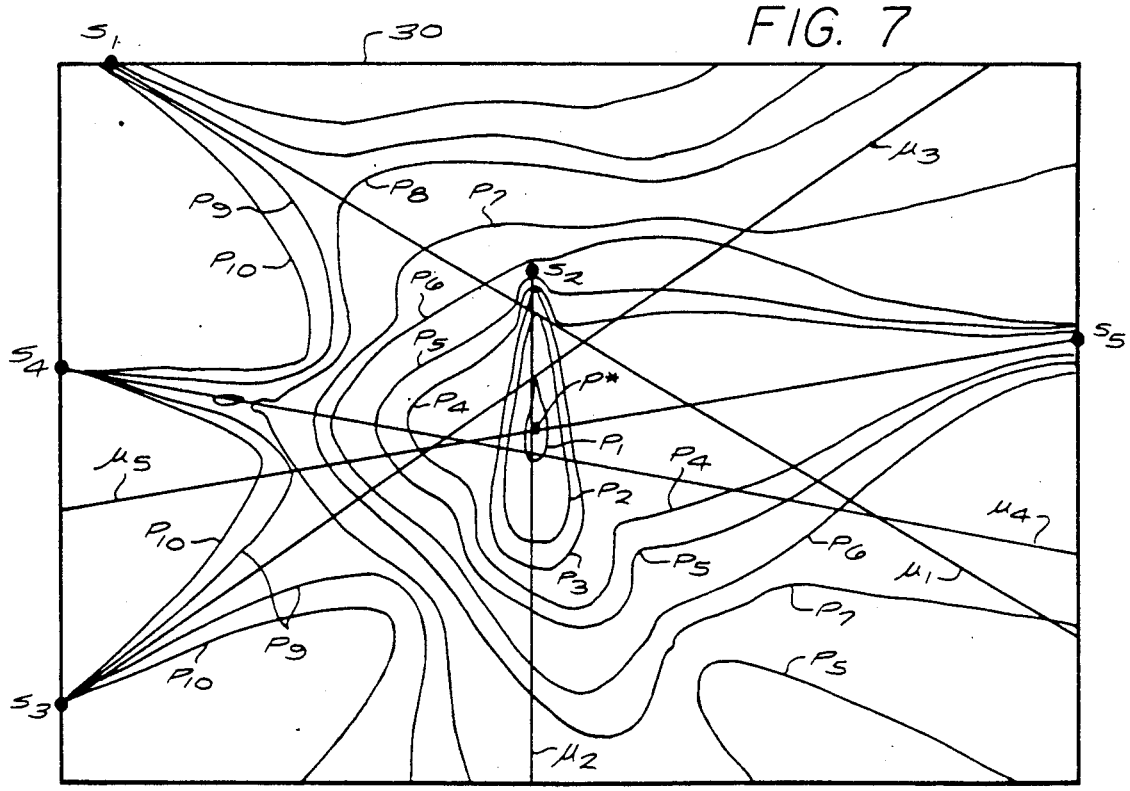

FIG. 7 illustrates a five-station test case, in which one additional station S4 is located at the center of the left side of the target area and in which another additional station S5 is located east of the center of the right side of the displayed target area. The LOB data $\mu_4$ and $\mu_5$ from the additional sensing stations are not particularly supportive of the other data. Also, the LOB $\mu_1$ from the first sensing station $S_1$ is relatively inconsistent with the other LOBs. However, the LOB of the "near station," i.e., $\mu_2$ from $S_2$, continues to dominate the result, and the estimated target location p* and the principle search areas (the regions of highest probability) still lie along $\mu_2$. Overall confidence in p* is, however, diminished by the inconsistency of the data, as is reflected by the lower probability gradient around p*.

Figure 8:
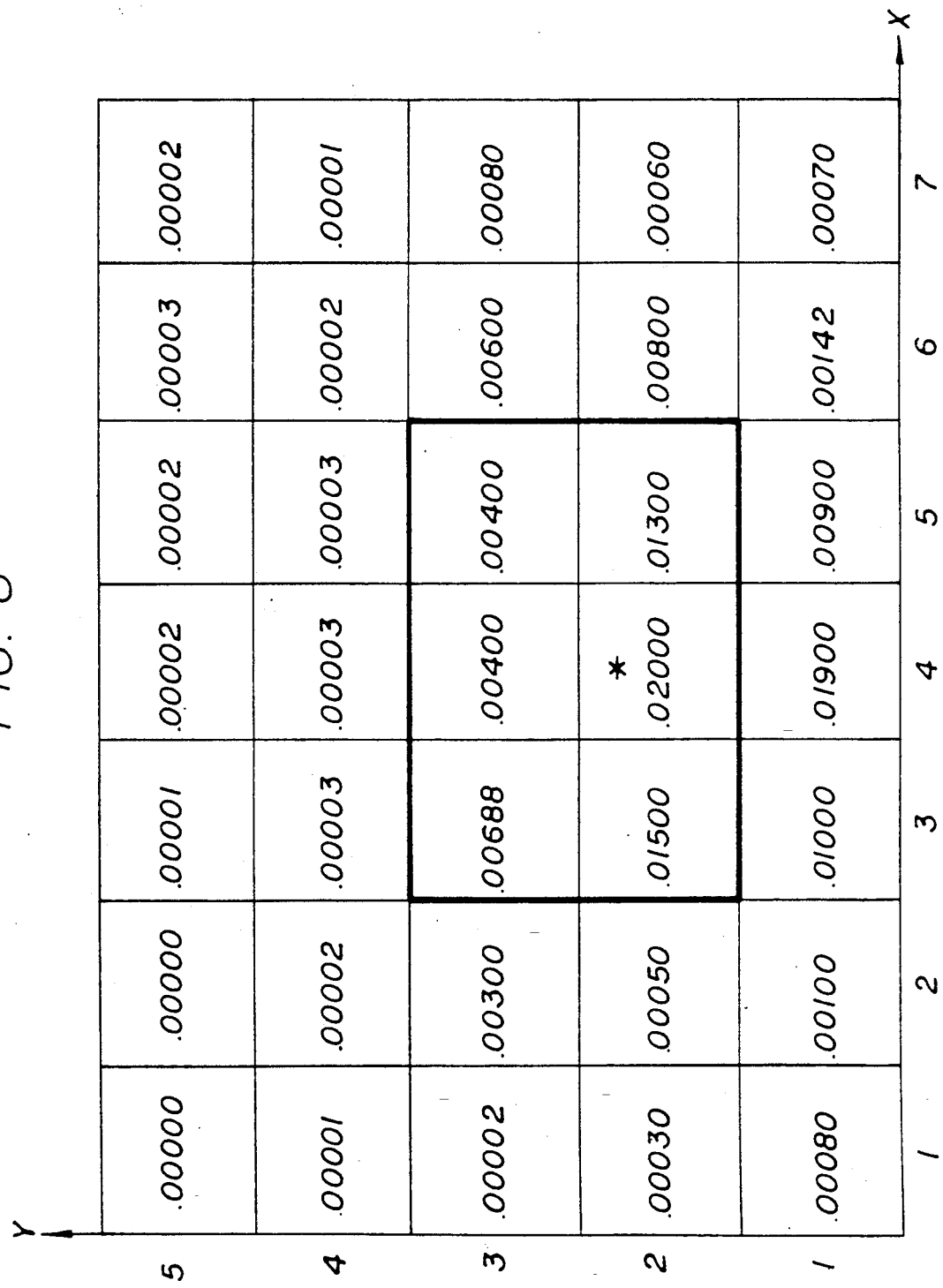
FIG. 8 illustrates a numerical example of calculated probabilities for a simplified representation of a target area.

FIG. 8 illustrates numerically a greatly simplified seven-by-five x-y target area grid (which may, for example, be a part of a larger grid). By way of example only, FIG. 8 also shows a global probability value associated with each grid cell (target area segment); the global values are calculated by the processor in the manner explained above. It is to be understood that the probability values associated with each target area segment are stored in the memory unit of the invention: the processor will preferably direct the monitor to display on the monitor a color-coded representation of the target area as described above.

The simplified grid shown in FIG. 8 illustrates another unique feature made possible by this invention. Observe first that G(4,2) has been identified as the estimated target location, since it has the greatest global probability. Assume that the operator wishes to know the probability that the target lies within the heavily outlined region including G(3-5,2) and G(3-5,3), which region corresponds to a search area of the target area.

Using the input unit 28, the operator selects the target area segments in the search area. This may be done in several different ways. For example, a light-pen, dials, a mouse, digitizer or similar device may be used as the input unit, in which case the operator outlines the search area on the monitor in a known manner. A standard keyboard may also be used, in which case the operator may, for example, maneuver a cursor on the monitor, or type in the coordinates of the corners of the search area, in order to delimit the search area. Other methods and input devices will be obvious to those skilled in the art.

According to the invention, once the operator defines the search area (once again, in the FIG. 8 example, the grid squares within the heavily outlined border), the processor calculates and displays on the monitor the Bayesian conditional probability that the target lies in the search area given the global probability values of all the target area segments in the whole target area. For example, given the exemplifying values in FIG. 8, the sum of all global probability values is $p_{tot} = 0.12427$. The sum of the global probability values within the search area is $p_{sa} = 0.06288$. The processor then calculates the conditional probability as the ratio between $p_{sa}$ and $p_{tot}$. In the illustrated example, the conditional probability is thus $0.06288 \div 0.12427 = 0.50600$, which is equivalent to 50.6%.

Given the values indicated in FIG. 8, and assuming that the operator is certain that the target lies in the indicated target area (within the seven-by-five grid), he then knows that there is a slightly better than one-half chance that the target lies in the search area, and he may direct search efforts to that area. If this search area is still too large, the operator may either restrict the search area further, whereby the processor calculates an updated conditional probability, or he may simply direct efforts to the maximum likelihood segment G(4, 2). In any case, this invention allows the operator to incorporate his own judgment and knowledge into the search effort, rather than the location system simply determining a single "fix."

In the application of the location method and system according to the invention described above, it has been assumed by way of example that the sensing stations will generate LOBs, that is, straight lines emanating from each station. Other sensing stations which may be used according to this invention include those using time-of-arrival (TOA) or differential-TOA measurements of the signal emitted by the target. Referring to FIG. 3, in such case the $\mu$ and $\sigma$ lines would be arcs (normally hyperbolas) on the surface of the grid rather than straight lines, with the $\mu$-arc for each station indicating the mean value of the differential time of arrival and the $+\sigma$ and $-\sigma$ arcs indicating the differences in distance from the mean value corresponding to a propagation time of $\sigma$ from the mean value.

Since the propagation velocity of emitted signals, as well as a probability distribution function describing its statistical variations, may be determined or approximated using known calibration and test methods, and since distance from the sensing station can be easily calculated from the velocity and travel time, the processor can calculate partial probabilities for each grid square in a manner analogous to the method described above for LOBs.

It is not necessary for the target to emit radio signals; rather, the invention is equally applicable to signals of any wavelength. For example, the sensing stations may be hydrophonic listening devices. If a submarine makes a sound in the target area which is sensed by the sensing stations, the same bearing or differential-TOA calculations may be used as above to estimate its most likely position. Furthermore, the invention is also applicable to *active* sensing stations; for example, the sensing stations may emit sonar signals and detected the reflection of these signals off an underwater target.

Neither is the invention limited to sea-based applications. For example, one may wish to determine the location of a police vehicle in a large city based on transmitted distress or radio signals from the vehicle. Although conventional triangulation may be used, if there are numerous buildings or other disturbances which tend to distort the bearing readings of the sensing stations, triangulation may be too uncertain. The system and method according to the invention is ideally suited to such an application.

Finally, this invention makes it possible for the operator to view a representation of the target area with probability contours and to define a search area as a subset of the target area, but the invention is not limited to such applications. Although the disadvantages of "automatic" target location, in which the location system reports only the coordinates of an estimated "fix," are discussed above, this invention is also advantageous in such applications since it is able to provide a maximum likelihood value of the target's location even in circumstances where conventional solutions would fail and such conventional solutions would report a "no-fix" result. The present system is also capable of automatically providing a maximum likelihood estimation of a single target position or location area without operator control and direction, and for such applications, the input unit and/or monitor may be left out.

What is claimed is:

1. A system for determining the position of a target in a target area including:
    a plurality of signal sensing stations, with each station comprising a high-frequency direction finding station and including bearing sensing means having a predetermined measurement probability distribution function for generating a sensed target bearing signal corresponding to a sensed bearing between the target and the station;
    processing means:
        a) for generating a representation of the target area as a pattern of target area segments;
        b) for assigning to each target area segment a partial probability value corresponding to a discrete representation of the measurement probability distribution function for said station; and
        c) for each target area segment, for calculating a composite probability value;
    display means for generating a representation of the pattern of target area segments as a pattern of displayed segments with likelihood markings corresponding to the composite probability value for each respective target area segment;

data transmission and receiving means for applying the sensed target signals to the processing means;

input means for designating chosen ones of the target area segments as a potential target region; and said processing means being provided with means for applying to the display means composite probability value signals corresponding to said composite probability values.

2. A system for determining the position of a target in a target area including:

a plurality of signal sensing stations, with each station including sensing means for generating a sensed target signal and having a predetermined measurement probability distribution relating each sensed target signal statistically to an actual target location variable;

processing means:
 a) for generating a representation of the target area as a pattern of target area segments;
 b) for assigning to each target area segment a partial probability value corresponding to a discrete representation of the measurement probability distribution function for said station; and
 c) for each target area segment, for calculating a composite probability value; and data transmission and receiving means for applying the sensed target signals to the processing means.

3. A system as defined in claim 2, further including:

display means for generating a representation of the pattern of target area segments as a pattern of displayed segments with likelihood markings corresponding to the composite probability value for each respective target area segment; and said processing means being provided with means for applying to the display means composite probability value signals corresponding to said composite probability values.

4. A system as defined in claim 2, further including input means for designating chosen ones of the target area segments as a potential target region, said processing means being further provided for calculating a regional probability value equal to the ratio between the sum of the composite probability values of the target area segments in the potential target region and the sum of all composite probability values.

5. A system as defined in claim 2, said sensing stations comprising high-frequency direction finding stations; and said sensed target signal being a measured bearing between each respective station and the target.

6. A method for determining the position of a target in a target area including the following steps:
 a) determining a measuring probability distribution function, having an independent variable, for each of a plurality of sensing stations;
 b) for each sensing station, registering a nominal measurement of a location variable relating the position of the target to the sensing station;
 c) generating a representation of the target area as a pattern of target area segments;
 d) for each sensing station, assigning to each target area segment a partial probability value corresponding to a discrete representation of the measurement probability distribution function for said station; and
 e) for each target area segment, calculating a composite probability value.

7. A method as defined in claim 6, further including the following steps:
 a) generating a representation of the pattern of target area segments as a pattern of displayed segments; and
 b) marking each displayed segment with likelihood markings showing the composite probability value for the corresponding target area segment.

8. A method as defined in claim 7, further including the step of marking with a target identification marking the displayed segment corresponding to the target area segment having a global maximum composite probability value.

9. A method as defined in claim 7, further including the step of marking with a target identification marking the displayed segments corresponding to each target area segment having a local maximum composite probability value.

10. A method as defined in claim 6, further including the following steps:
 a) calculating a total composite probability value as the sum of the composite probability values for all the target area segments;
 b) selecting chosen ones of the target area segments as a potential target region; and
 c) calculating a regional probability value as the ratio between the sum of the composite probability values of all the target area segments in the potential target region and the total composite probability value.

11. A method as defined in claim 10, in which each composite probability value is equal to the product of all partial probability values of the corresponding target area segment.

12. A method as defined in claim 6, in which the measurement probability distribution function for each sensing station includes a mean value parameter and a standard deviation parameter, including the following additional steps:
 a) for each sensing station, dividing the target area segments into deviation regions; and
 b) for each sensing station, assigning to each deviation region a predetermined regional deviation value constituting a regional value of the standard deviation parameter.

13. A method as defined in claim 6, in which:
 a) the location variable is a sensed bearing of the target relative to each sensing station, with the nominal measurement being a nominal sensed bearing;
 b) the target area segments are each bounded by lines of latitude and longitude;
 c) a reference point is chosen within each target area segment; and
 d) for each sensing station, the partial probability value for each target area segment is calculated using as an argument to the associated measurement probability distribution function the difference between the nominal sensed bearing and a calculated bearing to the reference point of the target area segment.

14. A method as defined in claim 13, further including the following steps for each sensing station:
 a) chosing the measurement probability distribution function as a Gaussian distribution function having a mean value $\mu$ and a predetermined standard deviation $\sigma$;
b) setting the mean value $\mu$ to the nominal sensed bearing;
c) for each target area segment, calculating a segment bearing between said sensing station and the reference point of said target area segment;
d) for each target area segment, calculating the associated partial probability value with the segment bearing constituting the argument of the Gaussian distribution function.

15. A method as defined in claim 6, in which:
a) the location variable is a sensed time of arrival at each respective sensing station of an emitted signal from the target, with the nominal measurement being a nominal sensed time of arrival;
b) the target area segments are each bounded by lines of latitude and longitude;
c) a reference point is chosen within each target area segment; and
d) for each sensing station, the partial probability value for each target area segment is calculated using the associated measurement probability distribution function, with the difference between the nominal sensed time of arrival and a reference time constituting the independent variable.

* * * * *